United States Patent
Luckmann et al.

(10) Patent No.: US 11,215,377 B2
(45) Date of Patent: Jan. 4, 2022

(54) CONTROL SYSTEM FOR CONTROLLING A COOLING SYSTEM

(71) Applicant: Danfoss A/S, Nordborg (DK)

(72) Inventors: Ejnar Luckmann, Nordborg (DK); Lars Jensen, Nordborg (DK)

(73) Assignee: Danfoss A/S, Nordborg (DK)

( * ) Notice: Subject to any disclaimer, the term of this patent is extended or adjusted under 35 U.S.C. 154(b) by 172 days.

(21) Appl. No.: 16/606,466

(22) PCT Filed: Apr. 11, 2018

(86) PCT No.: PCT/EP2018/059330
§ 371 (c)(1),
(2) Date: Oct. 18, 2019

(87) PCT Pub. No.: WO2018/192827
PCT Pub. Date: Oct. 25, 2018

(65) Prior Publication Data
US 2020/0370778 A1 Nov. 26, 2020

(30) Foreign Application Priority Data
Apr. 21, 2017 (DK) .............................. PA201700260

(51) Int. Cl.
*G05B 19/042* (2006.01)
*H04W 4/80* (2018.01)
(Continued)

(52) U.S. Cl.
CPC .............. *F24F 11/63* (2018.01); *F24F 11/50* (2018.01); *F24F 11/56* (2018.01); *F24F 11/62* (2018.01);
(Continued)

(58) Field of Classification Search
CPC .. F24F 11/63; F24F 11/62; F24F 11/80; F24F 11/50; F24F 11/64; F24F 11/56;
(Continued)

(56) References Cited

U.S. PATENT DOCUMENTS 9,222,693 B2  12/2015  Gourlay et al.
9,288,663 B2*  3/2016  Tanaka ................... G08C 17/02
(Continued)

FOREIGN PATENT DOCUMENTS

CN  101305350 A  11/2008
CN  104454198 A  3/2015
(Continued)

OTHER PUBLICATIONS

International Search Report for PCT Serial No. PCT/EP2018/059330 dated Jun. 21, 2018.

*Primary Examiner* — Charles R Kasenge
(74) *Attorney, Agent, or Firm* — McCormick, Paulding & Huber PLLC

(57) ABSTRACT

A control system (1) for controlling a cooling system comprising two or more cooling entities (2) is disclosed. The control system comprises a central control unit (3), two or more entity controllers (4), each entity controller (4) being associated with one of the cooling entities (2), and each entity controller (4) being provided with a nearfield communication interface (6) allowing communication between the entity controller (4) and a portable device (7), via a nearfield communication channel, and a secured communication network (5) connecting the central control unit (3) with each of the entity controllers (4). The central control unit (3) is configured to generate blocking signals and/or unblocking signals and communicate the blocking signals and/or unblocking signals to each of the entity controllers (4), via the secured communication network (5). Each of the entity controllers (4) is configured to block and/or unblock the nearfield communication interface (6), in accordance with received blocking signals and/or unblocking signals.

20 Claims, 2 Drawing Sheets

(51) Int. Cl.
*F24F 11/63* (2018.01)
*F24F 11/62* (2018.01)
*F24F 11/80* (2018.01)
*F24F 11/50* (2018.01)
*F24F 11/64* (2018.01)
*F24F 11/56* (2018.01)

(52) U.S. Cl.
CPC .............. *F24F 11/64* (2018.01); *F24F 11/80* (2018.01); *G05B 19/0423* (2013.01); *H04W 4/80* (2018.02); *F25B 2600/07* (2013.01); *G05B 2219/2614* (2013.01)

(58) Field of Classification Search
CPC ............... H04W 4/80; G05B 19/0423; G05B 2219/2614; F25B 2600/07; H04L 69/04; H04L 67/04; H04L 67/10; H04L 12/2818; H04L 67/125
See application file for complete search history.

(56) References Cited

U.S. PATENT DOCUMENTS

| | | | |
|---|---|---|---|
| 9,791,174 B2 | 10/2017 | Izadi-Zamanabadi et al. | |
| 10,209,680 B2* | 2/2019 | Schultz | G08C 17/02 |
| 10,298,557 B2* | 5/2019 | Jeon | H04W 12/50 |
| 10,352,607 B2 | 7/2019 | Cai et al. | |
| 2013/0176106 A1* | 7/2013 | Schultz | G08C 17/02 340/5.52 |
| 2014/0066045 A1* | 3/2014 | Tanaka | H04W 8/22 455/418 |
| 2014/0269614 A1* | 9/2014 | Maguire | H04L 65/80 370/331 |
| 2014/0280985 A1* | 9/2014 | Maguire | H04L 51/32 709/227 |
| 2014/0282967 A1* | 9/2014 | Maguire | H04W 12/068 726/7 |
| 2015/0249642 A1 | 9/2015 | Burns et al. | |
| 2016/0019417 A1 | 1/2016 | Kobayashi | |
| 2016/0209059 A1 | 7/2016 | Castillo et al. | |
| 2016/0286341 A1 | 9/2016 | Lee et al. | |
| 2016/0330182 A1* | 11/2016 | Jeon | A43B 3/0005 |
| 2016/0373270 A1 | 12/2016 | Yang et al. | |
| 2017/0208129 A1* | 7/2017 | Maguire | H04W 76/14 |

FOREIGN PATENT DOCUMENTS

| | | |
|---|---|---|
| CN | 106465152 A | 2/2017 |
| CN | 106537849 A | 3/2017 |
| KR | 20120065524 A | 6/2012 |
| RU | 2595540 C2 | 8/2016 |
| TW | 201223177 A1 | 6/2012 |

* cited by examiner

CONTROL SYSTEM FOR CONTROLLING A COOLING SYSTEM

CROSS-REFERENCE TO RELATED APPLICATIONS

This application is a National Stage application of International Patent Application No. PCT/EP2018/059330 filed on Apr. 11, 2018, which claims priority to Danish Patent Application No. PA201700260 filed Apr. 21, 2017, each of which is hereby incorporated by reference in its entirety.

TECHNICAL FIELD

The present invention relates to a control system for controlling a cooling system of the kind comprising two or more cooling entities, each being controlled by means of an entity controller. The control system further comprises a central control unit being configured to communicate with the entity controllers.

BACKGROUND

Vapour compression systems, such as refrigeration systems, air conditions or heat pumps, normally comprise a compressor unit, a heat rejecting heat exchanger and one or more cooling entities arranged in a refrigerant path. Each cooling entity comprises an expansion device, e.g. in the form of an expansion valve, and an evaporator. Thus, refrigerant flowing in the refrigerant path is alternatingly compressed by the compressor unit and expanded by the expansion device(s), while heat exchange takes place at the heat rejecting heat exchanger and the evaporator(s). The evaporator of each cooling entity may be in contact with a refrigerated volume, e.g. in the form of a display case of a refrigeration system of a supermarket.

In the case that the vapour compression system comprises two or more cooling entities, each cooling entity may be controlled by means of an entity controller. In this case the entity controller typically controls the expansion device in order to control the supply of refrigerant to the evaporator in such a manner that a desired target temperature is obtained in the refrigerated volume. Furthermore, a compressor controller may be configured to control the compressor unit, e.g. in order to maintain an appropriate suction pressure level. The compressor controller may further handle other tasks relating to the overall control of the vapour compression system.

It may sometimes be desirable to be able to access the entity controllers directly, e.g. in order to adjust settings, perform maintenance, retrieve diagnostics, etc. This may take place at a position of the cooling entity. In the case that the vapour compression system is a refrigeration system for a supermarket and the refrigerated volumes of the cooling entities are in the form of display cases of the supermarket, the cooling entities will be positioned in the publicly available store, rather than in an area with restricted access. This introduces the risk that unauthorized people, such as regular customers of the supermarket, may gain access to the entity controllers. This is particularly a risk in the case that the entity controllers can be accessed via a nearfield communication interface, such as a Bluetooth interface.

SUMMARY

It is an object of embodiments of the invention to provide a control system for controlling a cooling system in which unauthorized access to entity controllers can be prevented.

The invention provides a control system for controlling a cooling system comprising two or more cooling entities, the control system comprising:
  a central control unit,
  two or more entity controllers, each entity controller being associated with one of the cooling entities, and each entity controller being provided with a nearfield communication interface allowing communication between the entity controller and a portable device, via a nearfield communication channel, and
  a secured communication network connecting the central control unit with each of the entity controllers,
  wherein the central control unit is configured to generate blocking signals and/or unblocking signals and communicate the blocking signals and/or unblocking signals to each of the entity controllers, via the secured communication network, and wherein each of the entity controllers is configured to block and/or unblock the nearfield communication interface, in accordance with received blocking signals and/or unblocking signals.

The control system of the invention is for controlling a cooling system of the kind comprising two or more cooling entities. The cooling system could, e.g., be a vapour compression system comprising a compressor unit, a heat rejecting heat exchanger and the two or more cooling entities arranged in a refrigerant path, each cooling entity comprising an expansion device and an evaporator arranged in thermal contact with a refrigerated volume. In this case, the evaporators of the cooling entities are all connected to a common refrigerant path. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor unit, a heat rejecting heat exchanger and two or more cooling entities arranged in a refrigerant path. Each cooling entity comprises an expansion device, e.g. in the form of an expansion valve, and an evaporator arranged in thermal contact with a refrigerated volume. The refrigerated volumes could, e.g., be in the form of display cases of a refrigeration system for a supermarket. The refrigerant supply to the evaporator of a given cooling entity is controlled by means of the corresponding expansion device.

As an alternative, at least some of the cooling entities may be in the form of plug-in cooling entities or semi plug-in cooling entities. In this case the cooling entity in question is arranged in a separate refrigerant circuit, including a compressor unit and a heat rejecting heat exchanger, but is still connected to the control system which will be described below. The heat rejecting heat exchanger may, in this case, be arranged to exchange heat with a heat rejecting system, also having heat rejecting heat exchangers from other refrigerant circuits connected thereto, and the heat rejecting system may be arranged to reject heat from all of the refrigerant circuits via a common heat rejecting heat exchanger.

The control system comprises a central control unit and two or more entity controllers. Each entity controller is associated with one of the cooling entities. Thus, each of the entity controllers is arranged to control one of the cooling entities, in particular with respect to controlling the supply of refrigerant to the evaporator of the relevant cooling entity, by means of the expansion device, in order to maintain a target temperature in the refrigerated volume. The entity controllers may advantageously be positioned at or near the respective refrigerated volumes.

Each entity controller is provided with a nearfield communication interface allowing communication between the entity controller and a portable device, via a nearfield communication channel. Thereby it is possible for an operator to gain direct access to a given entity controller by arranging a suitable portable device in the vicinity of the entity controller and subsequently contacting the entity controller by means of the portable device and via the nearfield communication channel and the nearfield communication interface. It is not ruled out that such access may be subject to a suitable authentication process.

In the present context the terms 'nearfield communication interface' and 'nearfield communication channel' should be interpreted to mean a communication interface and a communication channel, respectively, which enable wireless communication between devices being arranged within a short distance of each other.

In the present context the term 'portable device' should be interpreted to mean an electronic device which is movable, as opposed to being stationary. Thereby the portable device can be moved to a position in the vicinity of a given entity controller. The device could, e.g., be a handheld device, such as a cell phone or a tablet, a laptop computer, or any other suitable kind of portable device.

The control system further comprises a secured communication network connecting the central control unit with each of the entity controllers. Accordingly, the central control unit may transmit communication signals to each of the entity controllers, via the secured communication network. The entity controllers may further transmit communication signals to the central control unit via the secured communication network.

In the present context the term 'secured communication network' should be interpreted to mean a closed communication network in the sense that access to the communication network is limited. It could, e.g., be in the form of wired communication network, a Local Area Network (LAN), a Wireless Local Area Network (WLAN), or any other suitable kind of secured communication network.

The central control unit is configured to generate blocking signals and/or unblocking signals and communicate the blocking signals and/or unblocking signals to each of the entity controllers, via the secured communication network. Thus, the blocking signals and/or unblocking signals are communicated from the central control unit to the entity controllers via a communication channel which is not readily accessible to unauthorized persons.

Each of the entity controllers is configured to block and/or unblock the nearfield communication interface, in accordance with received blocking signals and/or unblocking signals. Accordingly, if an entity controller receives a blocking signal from the central control unit, via the secure communication network, the entity controller will block the nearfield communication interface, thereby preventing direct access to the entity controller by means of a portable device and via the nearfield communication interface. Similarly, if an entity controller receives an unblocking signal from the central control unit, via the secure communication network, the entity controller will unblock the nearfield communication interface, thereby allowing the entity controller to be directly accessed by means of a portable device and via the nearfield communication interface.

Accordingly, the control system of the invention allows for centrally deciding whether or not direct access to the entity controllers by means of a portable device and via the respective nearfield communication interfaces should be prevented or allowed, and for communicating control signals in order to implement this at the individual entity controller, in a secure manner.

For instance, the central control unit may be positioned in a restricted area, where only authorized persons are allowed to access, while the cooling entities, and thereby the nearfield communication interfaces of the entity controllers, may be positioned in a public area, such as a store. In this case it is possible to manage the nearfield access to the entity controllers from a secure position. Furthermore, direct access to the entity controllers via the respective nearfield communication interfaces can be allowed whenever this is required, but can otherwise be prevented. Thereby maintenance, repair, updates etc. can easily be performed to the entity controllers by authorized persons while preventing that unauthorized persons gain access to the entity controllers, even though the entity controllers are positioned in a public area, such as a store. This is a great advantage.

Each of the entity controllers may further be configured to unblock the nearfield communication interface upon detection that the connection between the entity controller and the secured communication network has been interrupted.

According to this embodiment, the nearfield communication interfaces of the entity controllers may be blocked as a default, thereby ensuring to the greatest possible extent that no unauthorized persons are allowed to access the entity controllers via the respective nearfield communication interfaces. Under normal circumstances, when it is required to gain access to one or more of the entity controllers by means of a portable device and via the nearfield communication interface, an unblocking signal is generated by the central control unit and communicated to one or more of the entity controllers, via the secured communication network. Upon receipt of the unblocking signal, the relevant entity controller(s) unblocks the nearfield communication interface, thereby allowing an operator to access the entity controller.

However, in some cases it is not possible or practical to gain access to a restricted area where the central control unit is positioned. This may, e.g., be the case if urgent maintenance is required outside normal opening hours, for instance due to a breakdown. In this case an operator may instead interrupt the connection between the secured communication network and the entity controller, to which access is required, e.g. by disconnecting a cable or operating a switch. In response to registering this, the entity controller unblocks the nearfield communication interface and allows the operator to access the entity controller by means of a portable device. The cable or switch could, e.g., be positioned behind appropriate covering, e.g. in the form of a panel, in order to avoid that unauthorized persons gain access to the entity controller in this manner during normal operation. Furthermore, the access to the entity controller in this manner may be subject to authentication in order to further enhance the security.

The secure communication network may be a wired communication network. It could, e.g., be in the form of a Local Area Network (LAN), and it could comprise a field bus or the like interconnecting the central control unit and the entity controllers. As an alternative, the secure communication network could be a wireless communication network with limited access, such as a Wireless Local Area Network (WLAN).

The nearfield communication interface of each entity controller may be a Bluetooth communication interface. In this case a Bluetooth communication protocol is used for the communication between the portable device and the nearfield communication interface. Alternatively, any other suitable kind of nearfield communication protocol may be used for the communication between the portable device and the nearfield communication interface.

The central control unit may be configured to communicate blocking signals and/or unblocking signals to all of the entity controllers simultaneously. According to this embodiment, a single blocking signal or unblocking signal is generated by the central control unit and subsequently communicated to all of the entity controllers simultaneously. Thereby it is ensured that either all of the entity controllers are blocked or all of the entity controllers are unblocked. For instance, this allows the central control unit to efficiently block the nearfield communication interfaces of all of the entity controllers in one single action. Thereby it is prevented that the nearfield communication interface of one of the entity controllers is accidentally left unblocked, thereby unintentionally enabling unauthorized access to the entity controller via the nearfield communication interface.

Each entity controller may further be configured to automatically block the nearfield communication interface when no nearfield communication has taken place via the nearfield communication channel for a predefined time period. According to this embodiment, the nearfield communication interfaces of the entity controllers are normally blocked, and are only unblocked when required, e.g. in order to perform maintenance or repair, adjust settings, perform updates, etc. In the case that the operator forgets to initiate generation of a blocking signal upon completion of the required actions, the nearfield communication interfaces may unintentionally be left unblocked. However, by enabling the entity controllers to automatically block the nearfield communication interfaces when a certain time period has lapsed since nearfield communication took place, this situation is avoided, and thereby the security is enhanced.

For instance, the entity controllers may each be provided with a timer which is triggered when the entity controller detects that nearfield communication between a portable device and the nearfield communication interface is stopped. When the timer times out, the entity controller blocks the nearfield communication interface. If nearfield communication between the portable device and the nearfield communication interface is resumed before the timer times out, the timer is triggered again, starting a new time period. The timer may also be triggered upon receipt of an unblocking signal. Thereby it is ensured that entity controllers which have unblocked their nearfield communication interfaces in response to receipt of an unblocking signal, but without any nearfield communication taking place, are subsequently blocked.

Alternatively or additionally, the central control unit may be configured to generate a blocking signal and communicate the blocking signal to each of the entity controllers, via the secured communication network, when a predefined time period has lapsed since an unblocking signal was communicated to the entity controllers by the central control unit. According to this embodiment, the advantages described above are also obtained. However, in this case the blocking of the nearfield communication interfaces is controlled by the central control unit instead of by the individual entity controllers.

Each entity controller may further be provided with a display allowing the entity controller to communicate visually with an operator. This may, e.g., allow the operator to view and possibly adjust various settings for the cooling entity, such as temperature settings, to review alerts or alarms, etc. Alternatively or additionally, visual communication between the operator and the entity controller may take place via a display on the portable device.

The nearfield communication interface of a given entity controller may be configured to provide control access to the entity controller for an operator, via a portable device and the nearfield communication channel. This could, e.g., take place via an application installed on the portable device. The control access could, e.g., include maintenance and/or setting adjustment as described above.

The central control unit may be or form part of a frontend computer, such as a computer applied for managing the overall control of the vapour compression system. For instance, the central control unit may provide a gateway for communication with users, such as operators, including (remote) monitoring and interrogation, history/logging, mastering control functions, user interface and user authentication, etc.

The blocking signals and/or unblocking signals may be in the form of parameter commands. The parameter could, e.g., be 'Block Nearfield Communication' with the options 'On' or 'Off'.

The central control unit may comprise a user interface allowing an operator to access the central control unit in order to initiate generation of blocking signals and/or unblocking signals. According to this embodiment, an operator actively initiates blocking and/or unblocking of the nearfield communication interfaces of the entity controllers.

The operator may log on to the central control unit via the user interface, possibly subject to suitable user identification and/or user authentication. The operator may do this directly at the site of the central control unit. As an alternative, the operator may access the central control unit from a remote position, such as from a monitoring centre, and via a suitable communication network.

Once the operator has accessed the central control unit he or she may manually initiate the generation of the blocking signals and/or unblocking signals. Furthermore, the operator may set or adjust a time period to be applied in the case that the control system is configured to block the nearfield communication interfaces when a predefined time period has lapsed during which no nearfield communication has taken place, in the manner described above. It should be noted that, in the case that the control system defines such a time period, the manual initiation of a blocking and/or unblocking process will override the timer and immediately cause the central control unit to generate and communicate a blocking signal and/or an unblocking signal.

As an alternative to the manual initiation described above, a digital input may be set up at the central control unit which, via a hardwired key switch, can initiate an unblocking signal as long as the digital input and/or the key switch is on.

BRIEF DESCRIPTION OF THE DRAWINGS

The invention will now be described in further detail with reference to the accompanying drawings in which.

DETAILED DESCRIPTION

Figure 1:
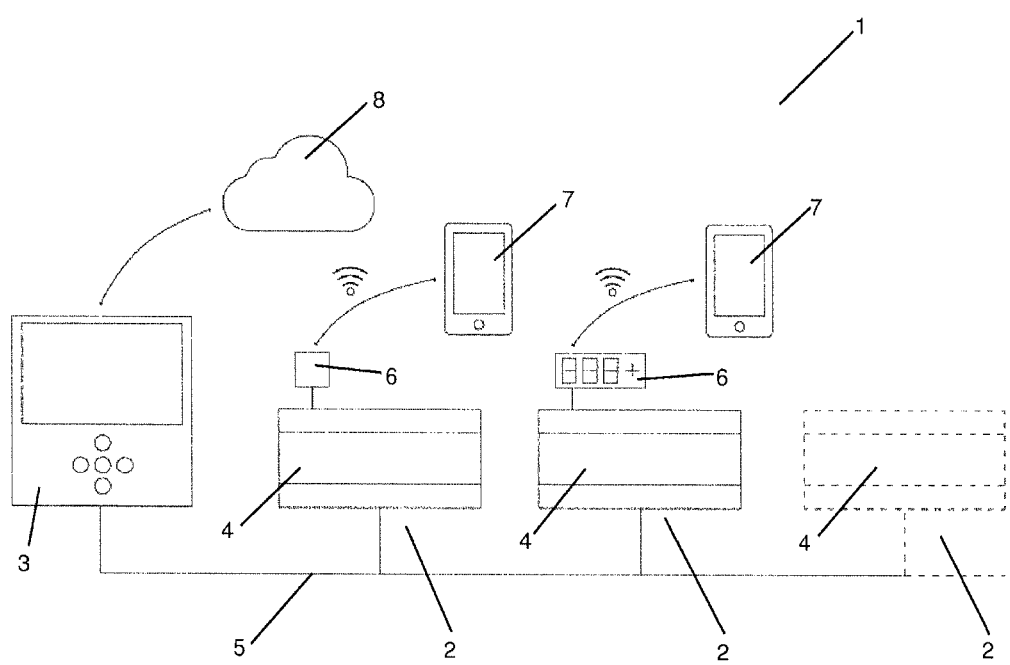
FIG. 1 is a diagrammatic view of a control system according to an embodiment of the invention.

FIG. 1 is a diagrammatic view of a control system 1 according to an embodiment of the invention. The control system 1 is for controlling a vapour compression system comprising two or more cooling entities 2, three of which are shown. The cooling entities 2 could, e.g., be in the form of display cases in a refrigeration system for a supermarket.

The control system 1 comprises a central control unit 3 and a number of entity controllers 4. Each entity controller 4 is associated with a cooling entity 2, in the sense that each entity controller 4 is arranged to control operation of one of the cooling entities 2.

The central control unit 3 and the entity controllers 4 are interconnected via a secured communication network 5. The secured communication network 5 could, e.g., be in the form of a wired communication network or in the form of a wireless communication network with limited access. In any event, it can be assumed that unauthorized persons are essentially prevented from gaining access to the secured communication network. Thus, communication between the central control unit 3 and each of the entity controllers 4 can take place in a secure manner.

Each entity controller 4 is provided with a nearfield communication interface 6 allowing nearfield communication between the entity controller 4 and a portable device 7, e.g. in the form of a smartphone, a tablet, a laptop or a similar portable device, arranged in the vicinity of the nearfield communication interface 6. Accordingly, an operator may access a given entity controller 4, using a suitable portable device 7, directly at the site of the entity controller 4, to the extent that the nearfield communication interface 6 grants access to the portable device 7.

The central control unit 3 may be positioned in a restricted area, such as an area where only authorized persons have access. On the other hand, the cooling entities 2, and thereby the nearfield communication interfaces 6, may be positioned in a publicly accessible area, such as inside a shop. In this case there is a risk of unauthorized persons accessing one of the entity controllers 4 via its nearfield communication interface 6, and using a portable device 7. This should be prevented, while ensuring that authorized persons are allowed to access the entity controllers 4 via their nearfield communication interfaces 6 whenever this is required.

In order to obtain this, the central control unit 3 is configured to generate blocking signals and/or unblocking signals and communicate the blocking signals and/or unblocking signals to each of the entity controllers 4, via the secured communication network 5. Upon receipt of a blocking signal from the central control unit 3, a given entity controller 4 will block its nearfield communication interface 6, thereby preventing nearfield communication between the entity controller 4 and a portable device 7. Accordingly, it is avoided that unauthorized persons subsequently gain access to the entity controller 4, via its nearfield communication interface 6. It is an advantage that the central control unit 3 can supply a blocking signal to all of the entity controllers 4 simultaneously, because thereby it is efficiently ensured that all of the nearfield communication interfaces 6 are blocked, by a single action. Furthermore, the risk of forgetting to block one of the nearfield communication interfaces 6 is considerably reduced.

On the other hand, when an authorized person, such as an operator or maintenance staff, needs to access one or more of the entity controllers 4, e.g. in order to perform maintenance or repair, adjusting settings, retrieving diagnostics, etc., the central control unit 3 generates an unblocking signal and communicates the unblocking signal to the entity controllers 4, via the secured communication network 5. Upon receipt of an unblocking signal from the central control unit 3, a given entity controller 4 unblocks its nearfield communication interface 6, thereby allowing nearfield communication between the entity controller 4 and a portable device 7. Accordingly, the operator or maintenance staff can subsequently access one or more of the entity controllers 4, via the nearfield communication interfaces 6, and using a suitable portable device 7.

It is an advantage that the blocking signals and/or unblocking signals are communicated from the central control unit 3 to the entity controllers 4 via the secured communication network 5, because thereby the signals are communicated in a secure manner, and the risk of fraudulent signals being sent to the entity controllers 4 is considerably reduced.

The entity controllers 4 may further be configured to unblock their nearfield communication interfaces 6 in the case that they are disconnected from the secured communication network 5. This could, e.g., be done by disconnecting a wire or operating a switch. Such wires and switches are normally positioned behind a panel or the like, which is not readily removable. Therefore the entity controllers 4 are still not easily accessible to unauthorized persons, via the nearfield communication interfaces 6. However, this provides a 'service backdoor' to maintenance staff. This could, e.g., be relevant in the case that urgent maintenance or repair is required outside normal opening hours, and it is not possible to gain access to the central control unit 3 in order to initiate generation of an unblocking signal. In this case the maintenance staff may instead remove the panel, disconnect the relevant entity controller 4 from the secured communication network 5 and then access the entity controller 4 via the unblocked nearfield communication interface 6.

The central control unit 3 is further remotely accessible via a cloud service 8, e.g. from a central monitoring centre. Thereby generation of blocking signals and/or unblocking signals can be initiated from such a remote location.

Figure 2:
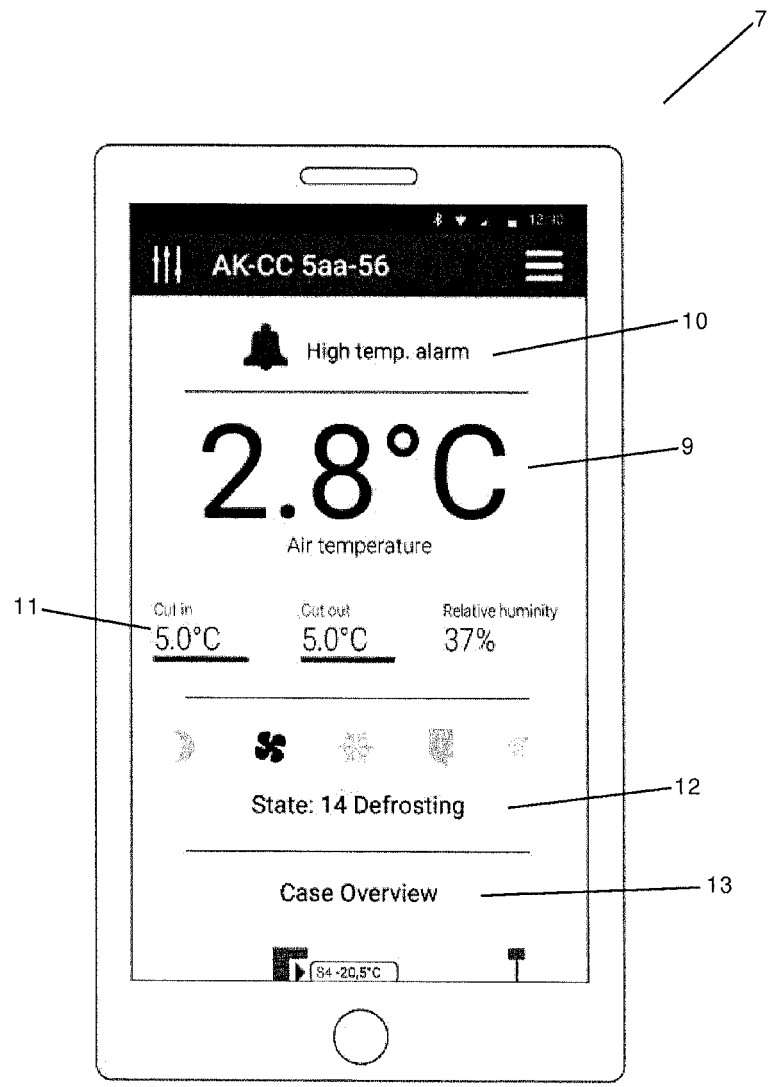
FIG. 2 illustrates an application running on a portable device for use in a control system according to an embodiment of the invention.

FIG. 2 is a portable device 7, in the form of a smartphone, having an application running thereon. The application is used in combination with a control system according to an embodiment of the invention, when an operator accesses an entity controller via its nearfield communication interface. The access to the entity controller may be subject to an authentication and/or identification process. Once access has been granted, the display of the portable device 7 displays information which is relevant with respect to the accessed entity controller. For instance, the air temperature 9 prevailing inside the refrigerated volume of the cooling entity may be displayed. In the example of FIG. 2 this temperature is 2.8° C. Furthermore, if the air temperature 9 is or has been above a predefined maximum level, a high temperature alarm 10 may be displayed, thereby pointing the attention of the operator to this fact.

Furthermore, various settings 11 of the cooling entity may be displayed, such as a cut-in temperature and a cut-out temperature. The cut-in temperature specifies an upper limit for the air temperature. When this temperature is reached, the expansion device of the cooling entity is opened, in order to supply refrigerant to the evaporator and thereby reduce the air temperature prevailing inside the refrigerated volume. Similarly, the cut-out temperature is a lower limit for the air temperature. When this temperature is reached, the expansion device of the cooling entity is closed, in order to stop the refrigerant supply to the evaporator. The air temperature prevailing inside the refrigerated volume is thereby allowed to increase. Once the operator has gained access to the entity controller, he or she may adjust such settings 11, using the application.

The state 12 of the cooling entity may also be displayed. In the example of FIG. 2, the cooling entity is in a defrost state, i.e. it is currently undergoing defrosting. Alternatively, the cooling entity could be in a cooling state, in a night state or in any other appropriate state. The operator may actively switch state of the cooling entity, using the application. For instance, the operator may switch the state of the cooling entity into the defrost state, thereby forcing the cooling entity to perform defrost.

Scrolling the display of the portable device 7, a case overview 13 will be displayed. The case overview 13 provides an overview of the operation and performance of the cooling entity, e.g. including historical data relating to relevant temperature levels and pressure levels, time for defrost, etc.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A control system for controlling a cooling system comprising two or more cooling entities, the control system comprising:
   a central control unit,
   two or more entity controllers, each entity controller being associated with one of the cooling entities, and each entity controller being provided with a nearfield communication interface allowing communication between the entity controller and a portable device, via a nearfield communication channel, and
   a secured communication network connecting the central control unit with each of the entity controllers,
   wherein the central control unit is configured to generate blocking signals and/or unblocking signals and communicate the blocking signals and/or unblocking signals to each of the entity controllers, via the secured communication network, and wherein each of the entity controllers is configured to block and/or unblock the nearfield communication interface, in accordance with received blocking signals and/or unblocking signals.

2. The control system according to claim 1, wherein each of the entity controllers is further configured to unblock the nearfield communication interface upon detection that the connection between the entity controller and the secured communication network has been interrupted.

3. The control system according to claim 2, wherein the secure communication network is a wired communication network.

4. The control system according to claim 2, wherein the nearfield communication interface of each entity controller is a Bluetooth communication interface.

5. The control system according to claim 2, wherein the central control unit is configured to communicate blocking signals and/or unblocking signals to all of the entity controllers simultaneously.

6. The control system according to claim 2, wherein each entity controller is further configured to automatically block the nearfield communication interface when no nearfield communication has taken place via the nearfield communication channel for a predefined time period.

7. The control system according to claim 1, wherein the secure communication network is a wired communication network.

8. The control system according to claim 7, wherein the nearfield communication interface of each entity controller is a Bluetooth communication interface.

9. The control system according to claim 7, wherein the central control unit is configured to communicate blocking signals and/or unblocking signals to all of the entity controllers simultaneously.

10. The control system according to claim 7, wherein each entity controller is further configured to automatically block the nearfield communication interface when no nearfield communication has taken place via the nearfield communication channel for a predefined time period.

11. The control system according to claim 1, wherein the nearfield communication interface of each entity controller is a Bluetooth communication interface.

12. The control system according to claim 11, wherein the central control unit is configured to communicate blocking signals and/or unblocking signals to all of the entity controllers simultaneously.

13. The control system according to claim 1, wherein the central control unit is configured to communicate blocking signals and/or unblocking signals to all of the entity controllers simultaneously.

14. The control system according to claim 1, wherein each entity controller is further configured to automatically block the nearfield communication interface when no nearfield communication has taken place via the nearfield communication channel for a predefined time period.

15. The control system according to claim 1, wherein the central control unit is configured to generate a blocking signal and communicate the blocking signal to each of the entity controllers, via the secured communication network, when a predefined time period has lapsed since an unblocking signal was communicated to the entity controllers by the central control unit.

16. The control system according to claim 1, wherein each entity controller is further provided with a display allowing the entity controller to communicate visually with an operator.

17. The control system according to claim 1, wherein the nearfield communication interface of a given entity controller is configured to provide control access to the entity controller for an operator, via a portable device and the nearfield communication channel.

18. The control system according to any of the claim 1, wherein the central control unit is or forms part of a frontend computer.

19. The control system according to claim 1, wherein the blocking signals and/or unblocking signals are in the form of parameter commands.

20. The control system according to claim 1, wherein the central control unit comprises a user interface allowing an operator to access the central control unit in order to initiate generation of blocking signals and/or unblocking signals.

* * * * *

UNITED STATES PATENT AND TRADEMARK OFFICE
CERTIFICATE OF CORRECTION

PATENT NO. : 11,215,377 B2  Page 1 of 1
APPLICATION NO. : 16/606466
DATED : January 4, 2022
INVENTOR(S) : Ejnar Luckmann et al.

It is certified that error appears in the above-identified patent and that said Letters Patent is hereby corrected as shown below:

In the Claims

Column 10, Claim 18, Line 50, after "according to" please delete "any of the".

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*